United States Patent [19]

Dippel

[11] Patent Number: 4,835,918
[45] Date of Patent: Jun. 6, 1989

[54] DEVICE FOR SHADING SPACES

[75] Inventor: Hans-Jurgen Dippel, Uhningen-Kattenhorn, Fed. Rep. of Germany

[73] Assignee: MWB Messwandler-Bau AG, Bamberg, Fed. Rep. of Germany

[21] Appl. No.: 242,719

[22] Filed: Sep. 9, 1988

Related U.S. Application Data

[63] Continuation-in-part of Ser. No. 914,812, Oct. 3, 1986, abandoned.

[30] Foreign Application Priority Data

Jul. 26, 1984 [DE] Fed. Rep. of Germany ....... 3427574

[51] Int. Cl.⁴ .................. E04H 15/00; E04D 13/18
[52] U.S. Cl. .......................................... 52/63; 52/109; 52/173 R; 135/110; 357/30; 126/440
[58] Field of Search .................. 135/91, 109, 110; 52/63, 109, 173; 357/30; 126/440

[56] References Cited

U.S. PATENT DOCUMENTS

| | | | |
|---|---|---|---|
| 3,411,050 | 11/1968 | Middleton | 357/30 |
| 3,433,677 | 3/1969 | Robinson | 357/30 |
| 4,411,490 | 10/1983 | Daniel | 126/440 |
| 4,485,264 | 11/1984 | Izu | 357/30 |
| 4,607,656 | 8/1986 | Carter | 52/109 |
| 4,641,676 | 2/1987 | Lynch | 135/110 |

*Primary Examiner*—John E. Murtagh
*Attorney, Agent, or Firm*—Bachman & LaPointe

[57] ABSTRACT

A device for shading areas, in particular for shading areas or plazas where people can walk, in desert areas, comprising a roofing surface which extends on carrier elements at a spacing from the surface to be shaded, preferably with a roof skin or membrane stretched on supports, to provide for shading of larger spaces with a minimum amount of obstruction by the supports, while at the same time using the effect of sunlight which is absorbed in producing the shade. For that purpose the outward side (31) of the roofing surface (12, 21) is occupied with photovoltaic elements (30) or is provided with a photovoltaic layer. The latter preferably comprises amorphous silicon or cadmium derivatives.

9 Claims, 2 Drawing Sheets

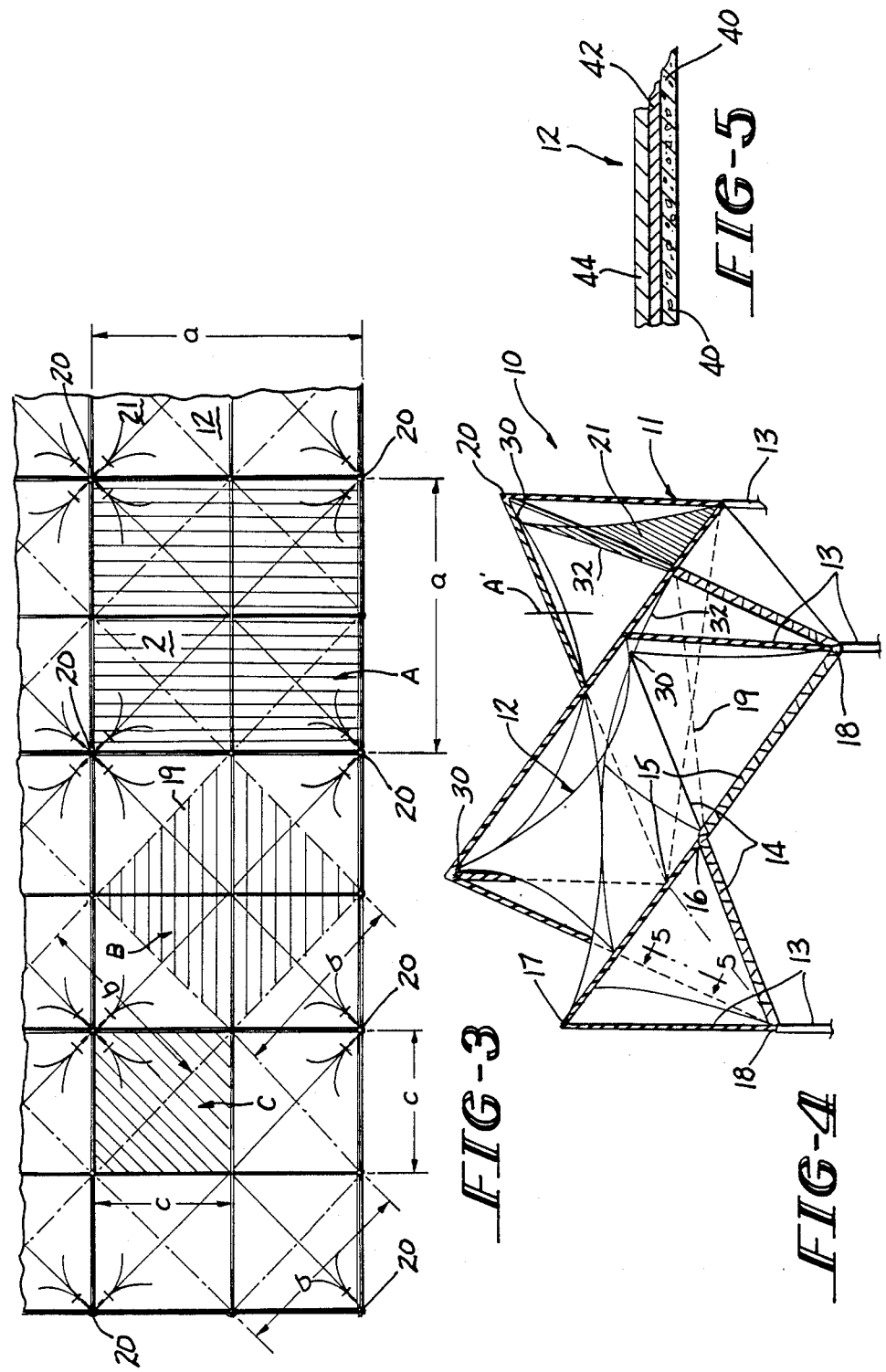

DEVICE FOR SHADING SPACES

CROSS REFERENCE TO RELATED APPLICATIONS

This is a continuation-in-part application of Ser. No. 914,812, filed Oct. 3, 1986, now abandoned, entitled Device For Shading Spaces by Hans-Jurgen Dippel.

BACKGROUND OF THE INVENTION

The present invention relates to a device for shading spaces and in particular for shading areas or plazas where people can walk, in desert areas, comprising a flexible roofing surface which extend on carrier elements at a spacing from the surface to be shaded, preferably with a roof skin or membrane which is stretched on supports. The present invention further relates to a shading device formed from a light plane load-bearing structure and having photovoltaic means to convert sunlight into electricity.

It is known for roofing structures of that kind to be made from stretched tent cloths or from netting materials in order in that way, during the daytime, to keep the spaces therebeneath for pedestrians, vehicles or the like at bearable temperatures. Such roofing structures can be used exclusively for the purposes of providing shade and must be capable of withstanding high temperatures, in accordance with the use for which they are intended.

SUMMARY OF THE INVENTION

Having regard to those facts, the inventor set himself the object of so designing a device of the kind set forth in the opening part of this specification, that it is possible to provide for shading for larger spaces with the minimum amount of obstruction and trouble due to the use of supports, while at the same time making use of the effects of sunlight which is absorbed in providing the shading effect.

To achieve that object, the invention proposes that the outward side of the roofing surface means be fitted with photovoltaic elements or be provided with a photovoltaic layer for converting light into electricity. Used to provide such a layer are amorphous silicon or cadmium derivatives which permit a high degree of adaption to and a close fit with the roof skins or membranes used, and which can also be matched to the oscillations thereof.

In another form of the roofing structure according to the invention, silicon crystals are applied in a flake-like or mutually partially overlapping relationship to the roof skin or membrane or a corresponding roof layer; that also provides for adaptation to the moving roof surface.

That combination of roofing structure and sunlight receiving means provides for considerably better use of the roof surfaces which hitherto were produced only to give shade, by virtue of the generation of electrical energy as an additional product.

If consideration is given to the large land areas which are to be found for example in Southern Europe, with solar cells standing on short posts, it will be clear that the present invention provides for the generation of power without taking up more area, by utilizing desirable shading cover structures.

Further advantages, features and details of the invention will be apparent from the following description of preferred embodiments and with reference to the accompanying drawings in which:

BRIEF DESCRIPTION OF THE DRAWINGS

FIGS. 2 and 3 are plan vies of a part of the roofing structure;

FIG. 4 is a slant view of a further embodiment of the roof structure; and

FIG. 5 is an enlarged sectional view according to line V—V of FIG. 4.

DETAILED DESCRIPTION

Figure 1:
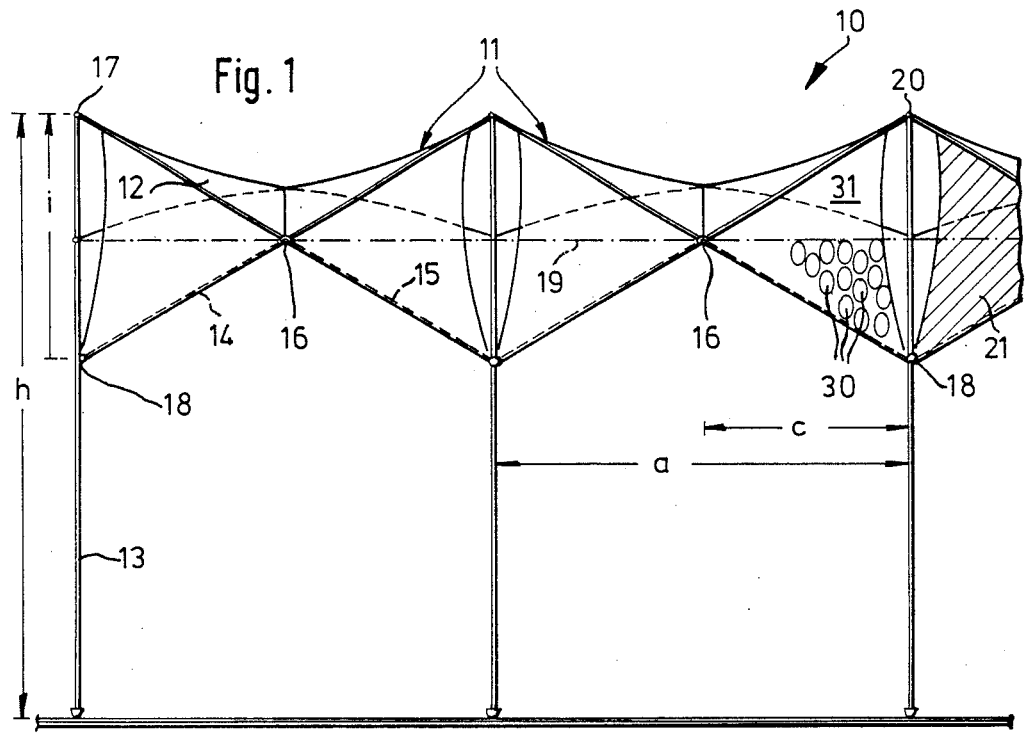
FIG. 1 is a side view of a roofing structure according to the invention for shading large areas or spaces.

Referring to the drawings, a roofing structure 10 for shading large areas or spaces comprises support assemblies 11 of the same configuration, and roof skins or membranes 12 which are stretched thereon to define a flexible roof surface. Mounted on the roof surface are photo-resistive cell means 30 for converting light to electricity. It is possible with this type of roofing structure to generate electricity while shading large areas or spaces.

The flexible roof skins or membranes 12 may have a sandwich construction with a bottom layer 40 for carrying the tentering forces, a middle layer 42 consisting of a photovoltaic material (i.e. amorphous, polycrystalline, monocrystalline silicon or cadmium derivatives) and an upper layer 44 of a highly transparent cover close. It is possible with these flexible membranes and the support assemblies 11 to form synclasticalky tentered fabrics (tentered in a double opposed curved manner) such as shown in FIG. 4.

Four supports 13, which are for example 10 meters in height, form the respective corner pillars for a roof support system comprising rods or bars 14 and 15, which cross at a central point of intersection 16 in the configuration of an X. The rods or bars 14 and 15 are fixed at their ends to the supports 13 at fixing points 17 and 18 which are spaced at a distance "i" from each other. The points of intersection 16 are engaged by the ends of horizontal screw rods or bars 19 which form a transversely extending stiffening system.

Figure 2:
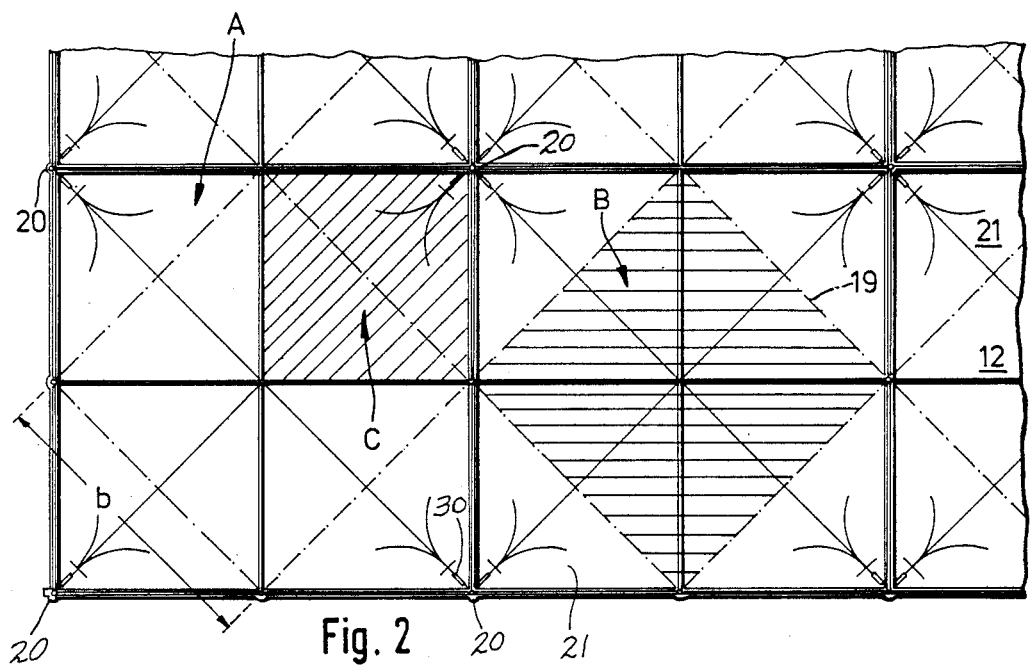

FIGS. 2 and 3 show the roofing structure 10 which consists of square surfaces or areas A, B and C, wherein the largest square A is defined by the support points 20 with a horizontal spacing indicated at a, the middle square B is defined by the horizontal members 19 with a length of its side as indicated at b, the length b representing the diagonal of the smallest square C with a length of side as indicated at c, which corresponds to half the horizontal distance a.

Between the four supports 13, the roof skin or membrane 12 is so tensioned that it forms a closed roof surface (area B), to which tip portions are connected; one of those tip portions is indicated at 21 at the right-hand side of FIG. 1. The lower end of the tip portion 21 is formed by the lower clamping point 18. Thus, the roof surface with tip portions 21 is suspended in a flutter-proof manner between the lower clamping points 18, the upper clamping points 17 and the members 14 and 15.

In order to be able to use the above-described roofing structure 10 which serves as a shading device, for the generation of power, mounted on the roof surface at 30 are photovoltaic cells which preferably comprise amorphous silicon and which convert the sunlight directly into electrical energy. The lines required for carrying the power away are not shown in the drawing for the sake of greater ease in viewing same.

Through the bending of the fabrics of the roof structure 12, folds 33 are formed, between the point 16 and the tenter facility arranged on both sides thereof. The folds limit a field A', onto which the tip portions 21 are connected. The cut according to FIG. 5 through the flexible roofing surface means 12 symbolically shows the supporting layer 40 which receives elastic forces, a layer 42 of photovoltaic material (amorphous, polycrystalline or monocrystalline silicon- or cadmium-derivatives) as well as a highly transparent roof layer 44 of weatherproof foil.

The photovoltaic cells 30 may consist of a thin glass pane onto which a silicon layer is vacuum evaporated. Alternatively, the cells 30 may be made of foils which are thinly coated with amorphous silicon. Still further, the cells may use cadmium derivatives instead of silicon.

Many of the cells may be connected in series with the cells of one series forming a group. The groups—5, for instance, —can generate voltages of 10, 20, 40, 80 and 160 volts. A so-called inverter not shown can connect these fields with the public electric network. Suitable electronics measure the alternating voltage of the public network and synchronize with it the cell voltage. Thus, the electric power is fed into the public network.

In a silicon cell, there are two layers with different electric properties. On the one side a greater amount of negatively charged electrons move between the atoms in the crystal lattice, on the other side a corresponding amount of positive charge carriers, the so-called holes, namely empty electron spaces, move in the crystal lattice. Since these holes are constantly occupied anew, they appear always in new positions—they behave like positive charge carriers migrating through the crystal lattice. In the so-called pn-transition (the electronic obstacle) in the cell result in the migration of the electrons and holes in opposed directions when photons hit the crystal lattice. Thus an electron flow is produced which is collected as electric current via contacts arranged outside the cell.

The photovoltaic elements 30 on the fabrics of the roof structure according to the invention are a simple line-up method for the photovoltaic which is simultaneously suitable for large-area roofing (providing shade, protection against weather). Furthermore, there is the possibility of including all components of a photovoltaic facility.

The fabrics forming the roof skins or membranes of the roof structure, preferably polyester fabrics coated with teflon, do not necessarily have to be occupied with solar cells. Complete solar modules can be applied to the fabrics of the roof structure. Moreover, there is the possibility of integrating solar modules into a rope net which can be enlarged to form a complete roofing (similar to the roofing of the Olympic Stadium in Munich) with plexiglass plates being replaced by solar modules. The functional connection remains the same in both cases.

It can also be seen that one of the advantages of the present invention is a price reduction of the basic construction of the PV-facilities is possible by directing solar modules to the sunlight by means of light plane load-bearing structures. This is possible also because the entire secondary facility (controller, storage, monitoring, measuring, etc.) of the PV-facility can be accommodated under the light plane load-bearing structure and no additional structure is required.

Further examples of application for the present invention are:

constructions of big rain-sprinkling installations—the partially filtered sun generates current which operates the pumps;

construction of warehouses, shelters, garages multifold use of the electricity; and roofing of refuse damps, for special garbage, in particular, stadiums, etc.

It is apparent that there has been provided in accordance with this invention a device for shading spaces and generating electricity from sunlight which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A device for shading spaces, especially for shading areas or plazas where people can walk, which comprises: roof support pillars; roof support means affixed to said pillars spaced from the surface to be shaded, said roof support means comprising rods or bars which cross at a central point of intersection in the configuration of an X and horizontal screw rods or bars forming a transversely extending stiffening system joined to each point of intersection; flexible roof skin or membrane means stretched on said roof support means for forming a roof surface, said roof surface having an outward side, said roof skin or membrane means being supported on said support means in a synclastically tentered manner; and said roof skin or membrane means including photovoltaic means for converting sunlight into electrical energy.

2. A device according to claim 1 wherein said crossing rods or bars have end points fixed to said pillars.

3. A device according to claim 1 wherein said photovoltaic means comprises a layer of amorphous silicon.

4. A device according to claim 1 wherein said photovoltaic means comprises a layer of cadmium or a cadmium derivative.

5. A device according to claim 1 wherein said photovoltaic means permit a high degree of adaptation to and close fit with said roof skin or membrane.

6. A device according to claim 1 wherein said photovoltaic means comprises silicon crystals fixed on the roof skin means.

7. A device according to claim 1 wherein the silicon crystals are movable relative to each other on the roof skin means.

8. A device according to claim 1 wherein said silicon crystals are present in a flake-like and partially overlapping relationship.

9. A device according to claim 1 wherein said roof skin or membrane comprises a supporting layer for receiving elastic forces, said photovoltaic means comprises a layer of photovoltaic material supported by said supporting layer, and a transparent layer over said photovoltaic material layer.

* * * * *